Dec. 15, 1959  D. ANDRYCHUK  2,917,629
METHOD FOR THE ANALYSIS OF LIQUID CHLORINE
Filed Feb. 25, 1957

INVENTOR
DMETRO ANDRYCHUK

BY *Warburton & Cross*

ATTORNEY

United States Patent Office 2,917,629
Patented Dec. 15, 1959

2,917,629

METHOD FOR THE ANALYSIS OF LIQUID CHLORINE

Dmetro Andrychuk, Painesville, Ohio, assignor to Diamond Alkali Company, Cleveland, Ohio, a corporation of Delaware Application February 25, 1957, Serial No. 642,201

3 Claims. (Cl. 250—43.5)

This invention relates to methods and apparatus for analyzing chlorine. Specifically the invention relates to the method of analyzing chlorine in order to determine the amount and type of impurities which may be contained therein. In general, the invention utilizes a beam of infra-red light passed through a body of chlorine in a refrigerated cell.

Basically the analysis of chlorine presents two problems, that of the corrosive nature of the chlorine itself coupled with the necessity of maintaining the chlorine in the liquid state, and providing a body of liquid chlorine so confined that the beam of infra-red light travels a uniform distance during the analysis. Several methods of analysis have heretofore been used, but none of these has proved completely successful. The most frequently used method of analyzing chlorine is to distill a small sample of liquid chlorine and analyze the so-called "heavy ends" (of higher boiling point than chlorine) of the distillate by infra-red spectroscopy. This method possesses several serious limitations however. Perhaps the most basic is that this method does not permit a quantitative determination of the impurities in the chlorine. Secondly, in some instances, the distillation method has failed to reveal even qualitatively some of the impurities in the chlorine. An example of such an impurity is phosgene, which, in the presence of water, is readily hydrolyzed, and, as such, is lost. The presence of such a compound would, therefore, be undetected by infra-red analysis of the "heavy ends" obtained by the distillation technique.

A second and more recent method of analyzing chlorine has been proposed by A. W. Pross and reported in volume 32 of "The Canadian Journal of Chemistry," page 956, 1955. This method, while also employing a beam of infra-red light, maintains the chlorine in the liquid state under pressure in a cell. This method of analysis likewise possesses several serious limitations which make it not satisfactory. The first of these limitations is the limited range of observation possible, since one is unable to scan above 8.5 microns. It is thus not possible to determine the presence of carbon tetrachloride, phosgene, or hexachloroethane, in the liquid chlorine. In addition, since the cells used are pressurized any breakage in the cell windows would, without warning, cause a sudden release of a large quantity of chlorine, thus suddenly creating a dangerous hazard to personnel and instruments.

It can thus readily be seen that the distillation method, in addition to its above-mentioned limitation, is long and tedious, and that although the pressure-cell method is much simpler it still does not fulfill all the needs of a reliable method for determining impurities in chlorine.

It is the object of this invention to provide a simple and reliable method of analyzing liquid chlorine.

Another object of the invention is to provide a quantitative as well as qualitative determination of the impurities contained in liquid chlorine.

Still another object is to provide a method of analysis having a more flexible range of the invention for examination that that found in any of the previous methods.

A further object is to provide a method of analyzing chlorine which is free from the hazards present in the previous analytical methods.

These and other objects will be apparent to those skilled in the art.

Referring now to the drawings, attached hereto and made a part hereof:

Figure 1:
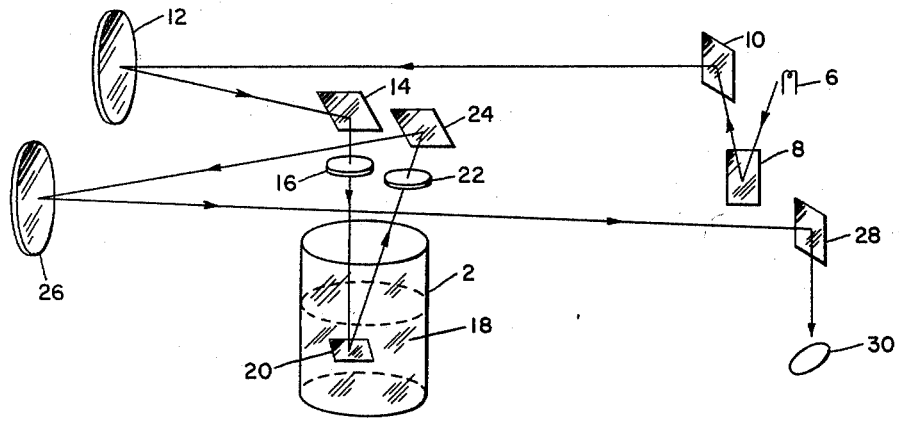
Fig. 1 is a schematic diagram of the optical system of the present invention, in which the light path has been traced.
Figure 2:
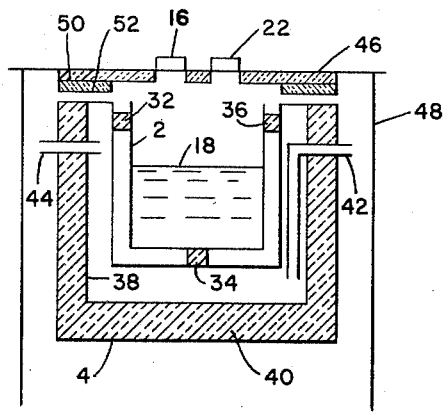
Fig. 2 is a vertical section through the apparatus by means of which a body of liquid chlorine is maintained in the liquid state at atmospheric pressure during the analysis procedure.

In general, the apparatus of the invention comprises a container 2 for the liquid chlorine which is kept in a refrigerated cell 4 in order to maintain the chlorine at a temperature below its boiling point at atmospheric pressure. A source of infra-red light 6 is provided, projecting a beam through an optical system comprising mirrors 8, 10, 12 and 14 which serve to direct the light from the source through a window 16, into the body of liquid chlorine 18, from whence it is reflected by a mirror 20, submerged therein, through window 22 to mirrors 24, 26, and 28, to the receiver 30 of an infra-red spectrometer.

Referring now to Fig. 1, a source of infra-red light is provided at 6. The plane mirror 8 directs the light to plane mirror 10, where it is reflected to spherical mirror 12, then to plane mirror 14, down through a sodium chloride window 16, through the body of liquid chlorine 18, to plane mirror 20, which is immersed in the liquid chlorine and upon which an image of the light source may be observed. From mirror 20 the light is reflected through a second sodium chloride window 22 to plane mirror 24 where it is reflected to spherical mirror 26. Spherical mirror 26 then focusses an image of the light source upon plane mirror 28, which image is then reflected upon the spectrometer 30. Since the light beam passes through the liquid chlorine during a portion of its path within the optical system, the impurities present in the liquid chlorine will characteristically absorb certain wave lengths thereof, and the absorption will be recorded in the spectrometer in the usual way.

With the exception of plane mirror 20, the mirrors are all front aluminized. Since mirror 20 is immersed in the body of liquid chlorine, it must be surfaced with some material which can withstand contact therewith. It has been found that by evaporating titanium upon a microscope slide in a vacuum, a thoroughly suitable mirror is produced, which withstands liquid chlorine, and shows no sign of corrosion even after two hours of immersion in the chlorine. This length of time is ordinarily more than sufficient to carry out an analysis, for all substances known to be associated with liquid chlorine obtained electrolytically.

Since chlorine is a gas at room temperatures, it must be cooled to temperatures below its boiling point during the entire analysis. To achieve this condition the container 2 for the body of liquid chlorine is placed in a refrigerated cell 4, container 2 preferably resting on glass wool blocks 32, 34, and 36, inside a double walled vessel 38, insulated from atmosphere by insulation 40. A suitable refrigerant such as acetone or methanol, is circulated between the walls of vessel 38, by means of a pump, not shown, through inlet 42, and outlet 44. The refrigerant may suitably be cooled by passing through a copper coil immersed in a Dry Ice acetone mixture, also not shown. The refrigerated cell 4 is attached by suitable means such as screws to a steel plate 46, and housing 48 the sodium chloride windows 22, and 16. The assembled unit is rendered gas-tight by means of gaskets 50 and 52, suitably fashioned of solid polytetrafluoroethylene and rubber, respectively.

During the course of the analysis the immersed mirror 20 may require some very critical adjustments. Since this mirror is immersed in chlorine during the recording of the spectra, all adjustments must be made externally after the chlorine container 2 is attached to the rest of the apparatus.

Figure 3:
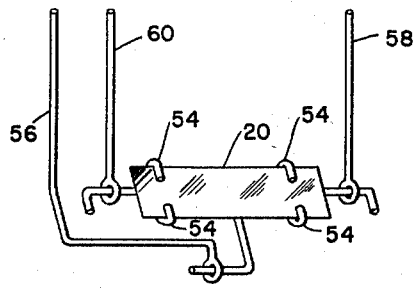
Fig. 3 is a detailed view of a portion of the apparatus for controlling the direction of a beam of infra-red light within the body of liquid chlorine.

Referring now to Fig. 3, the mirror 20 is held in a frame comprising brackets 54, and may be rotated about the horizontal axis by means of the rod 56. By means of the rods 58 and 60, mirror 20 may be moved vertically to adjust the depth of immersion. The adjusting rods 56, 58, and 60 are all of glass, in order to avoid contamination, and pass through gas tight openings, not shown, in the steel plate 46 of the cell 4. The details of these gas tight openings need not be illustrated here since suitable opening for the purpose are well known to those skilled in the art as a "Wilson" seal used in vacuum work.

In general, the method of analyzing chlorine comprises directing a beam of infra-red light from the source through the first portion of the optical system above described and into the liquid chlorine and back through the second part of the optical system to the slit of the spectrometer. The spectrum produced by the beam after passing through the liquid chlorine is recorded in the spectrometer and the optical densities (degree of light absorption) of the impurities contained in the chlorine are obtained. Initially, the optical densities are obtained from known mixtures, and are plotted on a standard graph of optical density versus concentration for each of the impurities contained in the chlorine, and from this graph the concentration of each of the impurities may be obtained.

As has been previously stated, the aparatus used in this analysis may be divided into two main components, the optical portion and the chlorine container or refrigerated cell portion. The refrigerated cell 4 of the apparatus is preferably mounted on wheels so as to be mobile, and made readily detachable from the optical portion, since by this means the refrigerated cell 4 may be partially filled with liquid chlorine in one place, such as in a hood or out-of-doors, and then put in its proper place in the optical system for analysis, without danger of injury to personnel or damage to equipment.

In using the apparatus of the invention, the following procedure may be employed: One liter of liquid chlorine is drawn from a container therefor and filtered through glass wool into the precooled glass container 2 supported in the refrigerator cell 4. A lid is placed on the container and the entire refrigerating unit is transported to the infra-red spectrometer. The container is clamped and placed in the optical system as shown digrammatically on the drawings.

Since it is necessary to know the depth at which the mirror 20 rests below the surface of the chlorine in order to determine the length of the path of light in the liquid chlorine, it is necessary to make this depth which is suitably done by lowering the mirror by means of rods 56, 58, and 60, until it is just coincident with the surface of the chlorine. The height of the top of the rods 58 and 60 above the steel plate 46 of the cell is determined accurately using height calipers. It is found that this measurement may readily be made to an accuracy of ±0.2 mm. The mirror is then lowered into the liquid chlorine to the desired depth and the height of the top of the rods 58 and 60 is again measured. The change in height gives the depth of the mirror below the surface and twice this depth gives the length of the path of the light through the liquid chlorine. It is found that for a path of 2 centimeters, an accuracy of ±5% of the amount of the impurity may be realized.

Following the adjustment of mirror 20 the remainder of the system is aligned; mirrors 8 and 10 being adjusted so that spherical mirror 12 is completely filled with light. Spherical mirror 12 is then adjusted along with mirror 14 so that the window 16 is completely filled with light and an image of the light source falls on mirror 20, which is then adjusted so that window 22 is filled with light. Mirrors 24 and spherical mirror 26 are adjusted until an image of the light source is formed slightly beyond mirror 28. By means of mirror 28 this image is reflected to the slit of the spectrometer 30. The final adjustment of mirror 28 is then carried out while observing the spectrometer recorder in order to determine the maximum energy output. With the cell thus aligned the spectra produced by the light passing through the chlorine is recorded.

Prior to making analyses, working curves for the impurities in the chlorine are established. These curves are made according to the accepted procedure of infra-red analysis with snythetic standards containing known amounts of known impurities in the substance to be analyzed and determining the optical densities at some suitable wave length and then plotting a graph of optical densities versus concentration. When the optical densities of each material is obtained in the analysis, it is plotted on the proper standard graph and its concentration is thus obtained.

The following table illustrates typical results which were obtained and the reproducibility when the length of the light path is changed:

Table I

| Experiment # | Optical Path, cm. | Density | Percent Impurity Calculated |
|---|---|---|---|
| #1 | 4.0 | 0.76 | 0.0116 |
| #2 | 1.0 | 0.181 | 0.0111 |
| | | | Ave. 0.0114% CHCl₃ |
| #1 | 4.0 | 0.656 | 0.00261 |
| #2 | 1.0 | 0.156 | 0.00248 |
| | | | Ave. 0.00254% COCl₂ |
| #1 | 2.6 | 0.017 | 0.00264 |
| #2 | 7.4 | 0.258 | 0.00225 |
| | | | Ave. 0.0024% CHCl₃ |

It is to be noted that a fourfold change in the path lengths still produces the same analysis result.

The following table illustrates the results obtained by analyzing several samples:

Table II

| Sample # | Percent by weight | | | |
|---|---|---|---|---|
| | $CCl_4$ | $CHCl_3$ | $COCl_2$ | $C_2Cl_6$ |
| 5339 | 0.0005 | 0.011 | 0.0025 | 0.0038 |
| 6692 | 0.0005 | 0.0005 | 0.0054 | 0.0005 |
| 5615 | 0.0005 | 0.0024 | 0.0005 | 0.0005 |

It is found that by using the method of this invention results are obtained in analyzing for phosgene and chloroform with an error of ±5% of the amount of these impurities, and for carbon tetrachloride and hexachloroethane results are obtained with an error of ±10% of the amount of these impurities.

It is to be understood that although the invention has been described with specific reference to particular embodiments of this invention, it is not to be so limited since changes and alterations therein may be made which are within the full intended scope of the invention defined by the appended claims.

What is claimed is:

1. A method for analyzing liquid chlorine to determine the amount and type of impurities contained therein, comprising placing the liquid chlorine in a container, refrigerating the container so as to maintain the chlorine at atmospheric pressure and in the liquid state, passing infra-red light through the liquid chlorine to an infra-red spectrometer, recording the spectra thus produced and plotting the optical density of each material thus shown to be present on a standard graph of optical density versus concentration for that material to determine its concentration in the chlorine.

2. A method for determining the type and the amount of impurities contained in liquid chlorine, comprising the steps of placing the liquid chlorine in a container, refrigerating the container so as to maintain the chlorine at atmospheric pressure and at a temperature below its boiling point, directing infra-red light into the liquid chlorine, reflecting the light from the liquid chlorine to an infra-red spectrometer, recording the spectra thus produced and plotting the optical density of each material thus shown to be present in the chlorine on a standard graph of optical density versus concentration for each material to determine the concentration of the material in the chlorine.

3. A method for analyzing liquid chlorine to determine the type and quantity of impurities contained therein, comprising the steps of placing the liquid chlorine in a container, refrigerating the container so as to maintain the chlorine at atmospheric pressure and in the liquid state, placing a plane mirror in the liquid chlorine parallel to the surface of the liquid and at a known depth, directing infra-red light by means of reflection into the liquid chlorine, reflecting the light from the liquid chlorine by means of the mirror therein to an infra-red spectrometer, recording the spectra thus produced and plotting the optical density of each material thus shown to be present in the chlorine on a standard graph of optical density versus concentration for that material to determine the amount of the material contained in the chlorine.

References Cited in the file of this patent

UNITED STATES PATENTS

| | | |
|---|---|---|
| 2,404,064 | Heigel et al. | July 16, 1946 |
| 2,671,154 | Burstein | Mar. 2, 1954 |
| 2,703,844 | Miller | Mar. 8, 1955 |
| 2,791,698 | Dryoff | May 7, 1957 |
| 2,826,701 | Columbe | Mar. 11, 1958 |